United States Patent
Li

(10) Patent No.: US 10,531,006 B2
(45) Date of Patent: Jan. 7, 2020

(54) METHOD AND DEVICE FOR CONTROLLING ELECTRONIC DEVICE AND COMPUTER-READABLE STORAGE MEDIUM

(71) Applicant: GUANGDONG OPPO MOBILE TELECOMMUNICATIONS CORP., LTD., Dongguan (CN)

(72) Inventor: Longjia Li, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/664,178

(22) Filed: Jul. 31, 2017

(65) Prior Publication Data

US 2018/0152639 A1    May 31, 2018

(30) Foreign Application Priority Data

Nov. 29, 2016   (CN) .......................... 2016 1 1079245

(51) Int. Cl.
H04N 5/232    (2006.01)
H04N 5/247    (2006.01)

(52) U.S. Cl.
CPC ..... *H04N 5/23296* (2013.01); *H04N 5/23229* (2013.01); *H04N 5/23238* (2013.01); *H04N 5/247* (2013.01); *H04N 5/23245* (2013.01)

(58) Field of Classification Search
CPC ........... H04N 5/23296; H04N 5/23229; H04N 5/23238; H04N 5/23245; H04N 5/247;
(Continued)

(56) References Cited

U.S. PATENT DOCUMENTS 8,937,646 B1    1/2015   Baldwin
8,957,944 B2 *  2/2015   Doepke .............. H04N 5/23238
                                                  348/211.4
(Continued)

FOREIGN PATENT DOCUMENTS

CN    202111758 U    1/2012
CN    104050167 A    9/2014
(Continued)

OTHER PUBLICATIONS

PCT/CN2017/096106 English translation of International Search Report and Written Opinion, dated Oct. 25, 2017, 13 pages.
(Continued)

*Primary Examiner* — Md N Haque
(74) *Attorney, Agent, or Firm* — Lathrop Gage LLP

(57) ABSTRACT

Embodiments of the present disclosure provide a method and a device for controlling an electronic device, and a computer-readable storage medium. The method includes: receiving a preset instruction; activating a second camera when controlling a first camera to capture a first image of a first field of view; controlling the second camera to capture a second image of a second field of view, in which the second field of view is different from or not exactly the same with the first field of view; and storing the first image and the second image, and establishing a correspondence between the first image and the second image.

11 Claims, 8 Drawing Sheets

(58) Field of Classification Search
CPC ............. H04N 5/2258; H04N 5/23293; H04N 5/232933; H04N 5/2353
See application file for complete search history.

(56) References Cited

U.S. PATENT DOCUMENTS

| | | | | |
|---|---|---|---|---|
| 9,204,026 | B2* | 12/2015 | Jeon | H04N 5/2258 |
| 9,635,251 | B2* | 4/2017 | Wagner | H04N 5/23238 |
| 9,942,476 | B2* | 4/2018 | Shimada | G03B 37/00 |
| 2012/0120186 | A1 | 5/2012 | Diaz et al. | |
| 2014/0240453 | A1* | 8/2014 | Kim | H04N 5/2258 348/38 |
| 2014/0320604 | A1* | 10/2014 | Dalvi | H04N 13/289 348/47 |
| 2014/0375762 | A1* | 12/2014 | Ohki | H04N 5/23238 348/36 |
| 2015/0138314 | A1* | 5/2015 | Vincent | H04N 5/23238 348/38 |

FOREIGN PATENT DOCUMENTS

| | | |
|---|---|---|
| CN | 104159026 A | 11/2014 |
| CN | 104639805 A | 5/2015 |
| CN | 104902170 A | 9/2015 |
| CN | 105049686 A | 11/2015 |
| CN | 105791701 A | 7/2016 |
| CN | 106161964 A | 11/2016 |
| CN | 106454130 A | 2/2017 |
| EP | 3154257 A1 | 4/2017 |

OTHER PUBLICATIONS

PCT/CN2016/073679 English translation of International Search Report dated Nov. 10, 2016, 2 pages.
European Patent Application No. 17184224.8 extended Search and Opinion dated Dec. 21, 2017, 8 pages.
European Patent Application No. 17184224.8 Office Action dated Jul. 23, 2018, 8 pages.
Chinese Patent Application No. 201611079245.3 English translation of Office Action dated Nov. 29, 2018, 11 pages.
Chinese Patent Application No. 201611079245.3 Office Action dated Nov. 29, 2018, 8 pages.

* cited by examiner

METHOD AND DEVICE FOR CONTROLLING ELECTRONIC DEVICE AND COMPUTER-READABLE STORAGE MEDIUM

CROSS-REFERENCE TO RELATED APPLICATIONS

This application is based on and claims a priority to Chinese Patent Application Serial No. 201611079245.3, filed on Nov. 29, 2016, the entire contents of which are incorporated herein by reference.

FIELD

The present disclosure relates to imaging technology field, and more particularly, to a method for controlling an electronic device, a device for controlling an electronic device and a computer-readable storage medium.

BACKGROUND

In the related art, a field of view of a camera in an electronic device (for example, a mobile phone, a portable android device and a wearable device) is limited. However, it has become very common to use the camera of the electronic devices to capture images.

SUMMARY

Embodiments of the present disclosure provide a method for controlling an electronic device. The method includes: receiving a preset instruction, activating a second camera when controlling a first camera to capture a first image of a first field of view; controlling the second camera to capture a second image of a second field of view, in which the second field of view is different from or not exactly the same with the first field of view; and storing the first image and the second image, and establishing a correspondence between the first image and the second image.

Embodiments of the present disclosure provide an electronic device. The device includes a first camera, a second camera, a processor and a memory for storing instructions executable by the processor. The processor is configured to: receive a preset instruction; activate the second camera when controlling the first camera to capture a first image of a first field of view; control the second camera to capture a second image of a second field of view, in which the second field of view is different from or not exactly the same with the first field of view; and store the first image and the second image, and establish a correspondence between the first image and the second image.

Embodiments of the present disclosure provide a non-transitory computer-readable storage medium having stored therein instructions that, when executed by a processor of an electronic terminal, causes the electronic terminal to perform a method for controlling an electronic device. The method includes: receiving a preset instruction, activating a second camera when controlling a first camera to capture a first image of a first field of view; controlling the second camera to capture a second image of a second field of view, in which the second field of view is different from or not exactly the same with the first field of view; and storing the first image and the second image, and establishing a correspondence between the first image and the second image.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
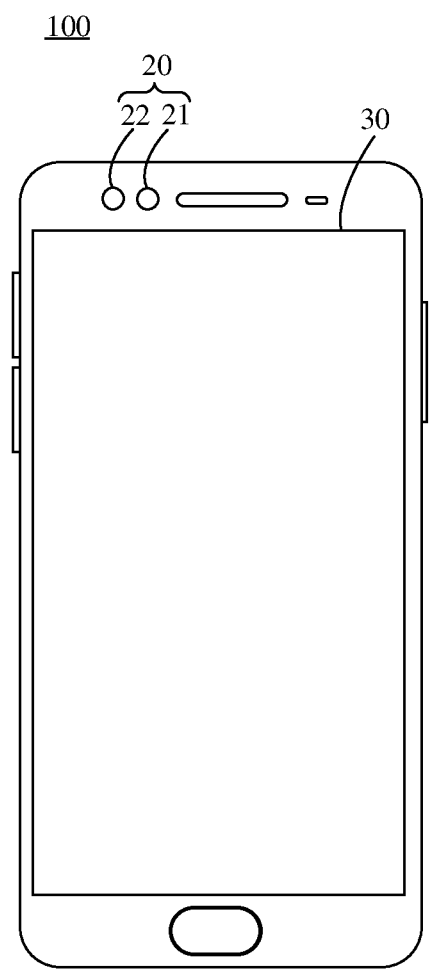
FIG. 1 is a schematic diagram illustrating an electronic terminal according to embodiments of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

FIG. 1 is a schematic diagram illustrating an electronic terminal according to embodiments of the present disclosure. In embodiments of the present disclosure, the electronic terminal 100 may be a smart phone, a computer, a portable android device, a personal digital assistant, a wearable device, etc. As illustrated in FIG. 1, the electronic terminal 100 may be the smart phone. The electronic terminal 100 may include a controlling component (not illustrated in FIG. 1), an imaging component 20 and a displayer 30. The imaging component 20 may include a first camera 21 and a second camera 22 (the first camera 21 and the second camera 22 are interchangeable). In some embodiments, the imaging device 20 may be front dual cameras or rear dual cameras. The electronic terminal 100 may further include an inputting component (not illustrated in FIG. 1). It should be understood that, the inputting component may further include one or more of the followings: an inputting interface provided by the displayer 30, a physical button of the electronic terminal 100, a microphone, etc.

It should be understood that, the electronic terminal 100 may further include one or more of the following components (not illustrated in FIG. 1): a memory, a power component, an audio component, an input/output (I/O) interface, a sensor component and a communication component. The memory is configured to store various types of data. The power component is configured to provide power to various components of the electronic device 100. The audio component is configured to output and/or input audio signals, for example, the audio component includes a microphone. The I/O interface is configured to provide an interface between the controlling component and peripheral interface modules. The sensor component includes one or more sensors to provide status assessments of various aspects of the electronic device 100. The communication component is configured to facilitate communication, wired or wirelessly, between the electronic device 100 and other devices.

Based on the above embodiments, embodiments of the present disclosure provide a method for controlling an electronic device 100. The method is configured to control the electronic device 100 to capture images.

Figure 2:
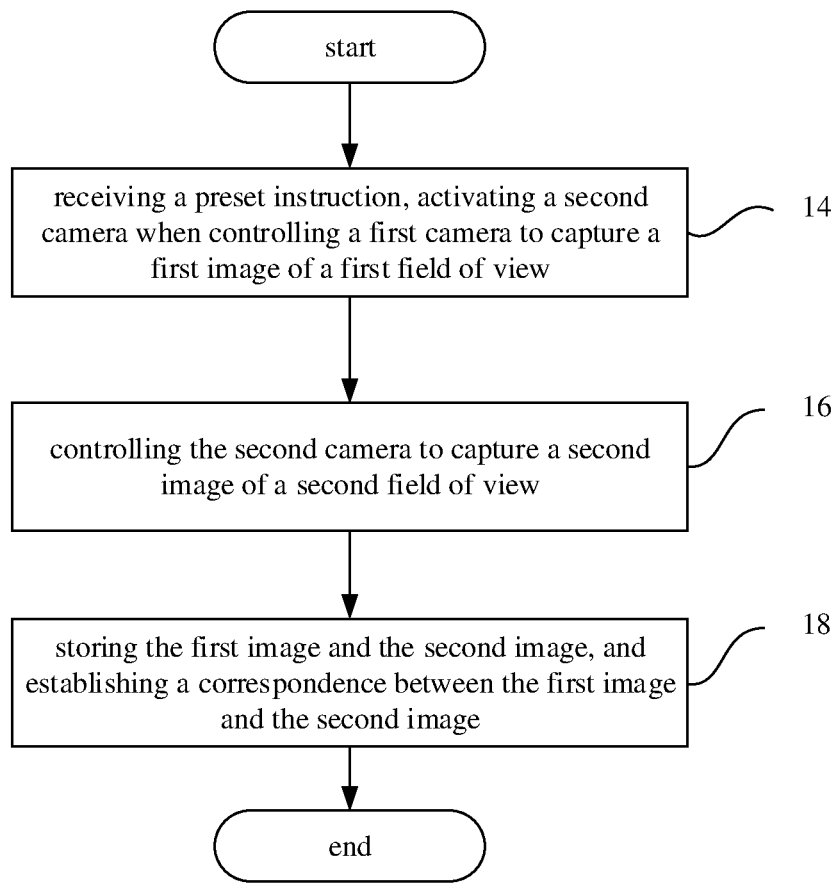
FIG. 2 is a flow chart of a method for controlling an electronic device according to embodiments of the present disclosure.

FIG. 2 is a flow chart of a method for controlling an electronic device according to embodiments of the present disclosure. As illustrated in FIG. 2, the method includes followings.

At block 14, a preset instruction is received, and a second camera is activated when a first camera is controlled to capture a first image of a first field of view.

At block 16, the second camera is controlled to capture a second image of a second field of view. The second field of view is different from or not exactly the same with the first field of view.

At block 18, the first image and the second image are stored, and a correspondence between the first image and the second image is established.

With the method in embodiments of the present disclosure, the second camera is controlled to capture the second image of the second field of view while the first camera is controlled to capture the first image of the first field of view, thereby realizing associated capturing of the two cameras. According to the associated cameras, different images of different fields of view may be captured simultaneously and the correspondence between the different images may be established, thereby realizing an associated operation of the different images according to the correspondence, for example, two different images are displayed in the displayer to a user.

Figure 3:
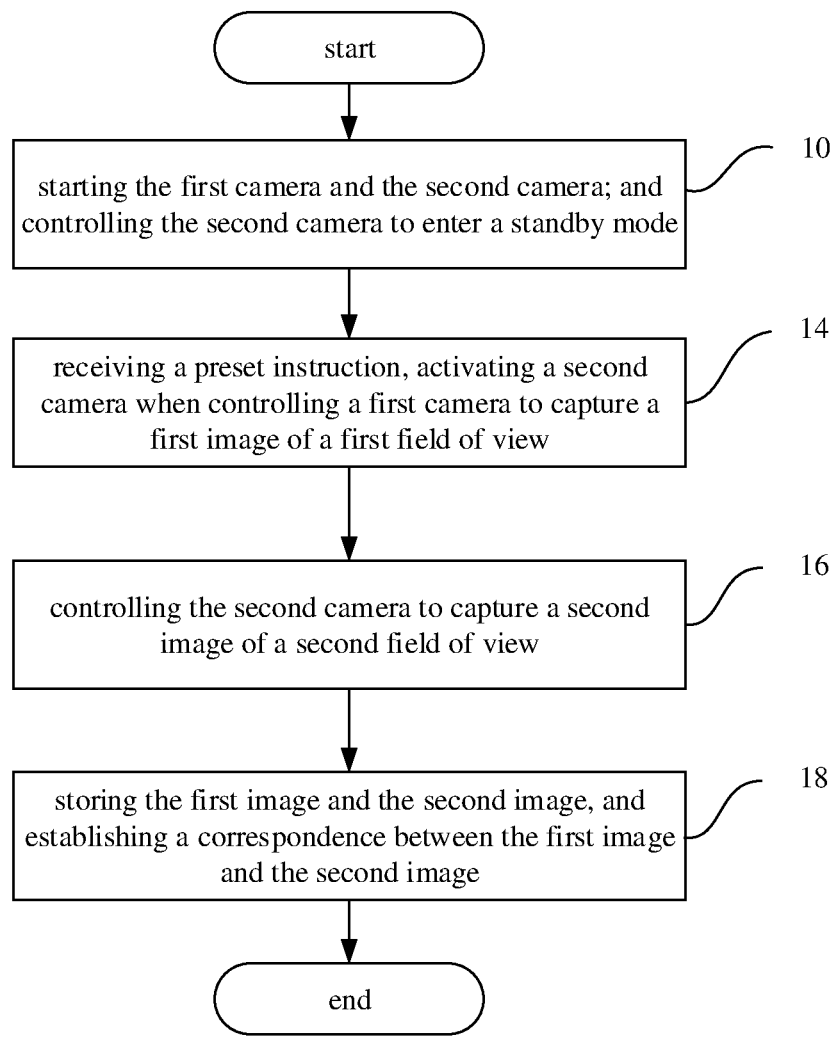
FIG. 3 is a flow chart of a method for controlling an electronic device according to embodiments of the present disclosure.

FIG. 3 is a flow chart of a method for controlling an electronic device according to embodiments of the present disclosure. As illustrated in FIG. 3, the method includes followings.

At block 10, the first camera and the second camera are started and the second camera is controlled to enter a standby mode.

For example, the user opens the camera application of the electronic device, and the camera application starts the first camera and the second camera; or the user presses the preset button to start the first camera and the second camera. After the first camera and the second camera are started, the second camera is controlled to enter the standby mode if no instruction is received by the electronic device within a preset time period, for example, a few seconds. Or, after the first camera and the second camera are started, the second camera is controlled to enter the standby mode immediately.

In embodiments of the present disclosure, the standby mode may be that, the camera is kept in an energized state but does not perform other operations such as setting capturing parameters.

At block 14, the preset instruction is received, and a second camera is activated when a first camera is controlled to capture a first image of a first field of view.

For example, the controlling component in the electronic device may monitor the inputting component, such as the inputting interface provided by the displayer, the physical button of the electronic device, or the microphone. The controlling component may accept the preset instruction after the user enters the preset instruction on any of the inputting components described above, for example, after the user clicks a "panorama" button or an "activating the second camera" button in the inputting interface.

At block 16, the second camera is controlled to capture a second image of a second field of view. The second field of view is different from or not exactly the same with the first field of view.

At block 18, the first image and the second image are stored, and a correspondence between the first image and the second image is established.

With the method in embodiments of the present disclosure, if the user does not send the preset instruction to the electronic device, only the first camera is used for capturing and the second camera enters the standby mode. When the electronic device receives the preset instruction, the second camera is activated to capture. Therefore, power consumption and resource consumption during capturing may be reduced effectively. In addition, when the user inputs the preset instruction to the electronic device, the second camera may be quickly activated, thereby reducing a waiting period for the user and improving the user experience.

In embodiments of the present disclosure, the preset instruction includes a panoramic capturing instruction. For example, when the camera of the electronic device is turned on, the application for controlling the camera to capture provides a plurality of capturing buttons. When the user clicks the "panorama" button, the panoramic capturing instruction is input to the electronic device.

In embodiments of the present disclosure, the preset instruction includes a triggering instruction for activating the second camera. For example, when the camera of the electronic device is turned on, the application for controlling the camera to capture provides a plurality of capturing buttons. When the user clicks the "activating the second camera" button, the triggering instruction is input to the electronic device.

In embodiments of the present disclosure, the electronic device may further include a rotating motor. The rotating motor is configured to drive the second camera to rotate.

Figure 4:
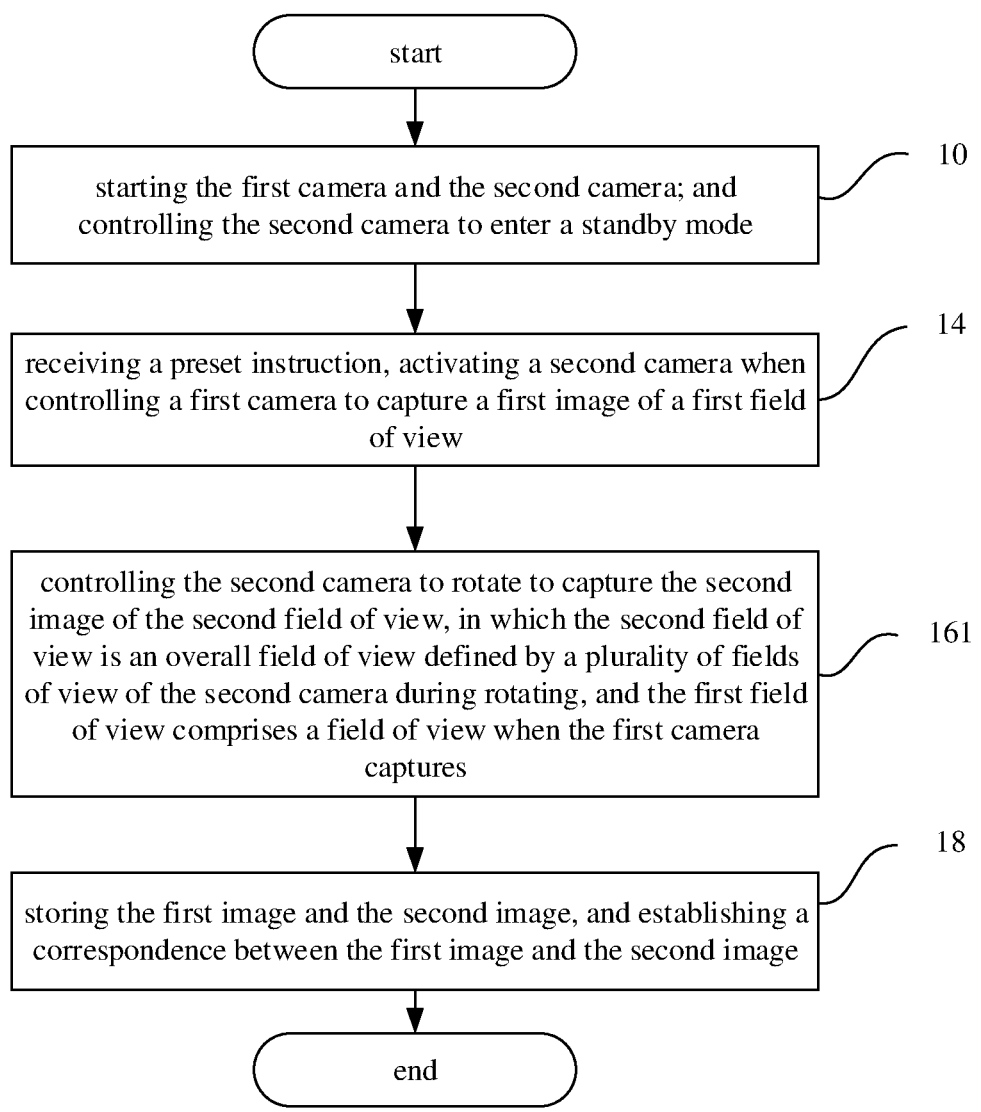
FIG. 4 is a flow chart of a method for controlling an electronic device according to embodiments of the present disclosure.

FIG. 4 is a flow chart of a method for controlling an electronic device according to embodiments of the present disclosure. As illustrated in FIG. 4, the method includes followings.

At block 10, the first camera and the second camera are started and the second camera is controlled to enter a standby mode.

At block 14, the preset instruction is received, and a second camera is activated when a first camera is controlled to capture a first image of a first field of view.

At block 161, the second camera is controlled to rotate to capture the second image of the second field of view, in which the second field of view includes is an overall field of view defined by a plurality of fields of view of the second camera during rotating, and the first field of view includes a field of view when the first camera captures.

In embodiments of the present disclosure, the first camera is a fixed camera, and the second camera is a rotatable camera. The second camera may rotate under a driving of the rotating motor. In embodiments of the present disclosure, the fixed camera may be a wide angle camera, and the rotatable camera may be a telephoto camera. In embodiments of the present disclosure, an angle of view of the fixed camera may be from 70 degree to 90 degree, and an angle of view of the rotatable camera may be from 20 degree to 60 degree.

If the rotating motor is not started, the first field of view of the first camera (e.g. the wide angle camera) is greater than the second field of view of the second camera (e.g. the telephoto camera). If the rotating motor is started, the second field of view corresponding to the rotation angle of the second camera (e.g. the telephoto camera) may be less than, equal to, or greater than the first field of view of the first camera (e.g. wide angle camera).

The wide angle camera refers to a camera with a wide angle lens, which generally has a short focal length and a great angle of view. The angle of view of the wide angle camera in a specific embodiment of the present disclosure may be about 80 degree. The wide angle camera is generally configured to capture close-range scenes.

The telephoto camera refers to a camera with a telephoto lens, which generally has a long focal length and a small angle of view. The angle of view of the telephoto camera in a specific embodiment of the present disclosure may be about 40 degree. The telephoto camera is generally configured to capture long-range scenes. The telephoto camera may obtain clear images when capturing long-range scenes.

At block 18, the first image and the second image are stored, and a correspondence between the first image and the second image is established.

With the method in embodiments of the present disclosure, when the user wants to capture the region of interest, he/she may start the wide-angle camera to capture the close-range image (i.e. the first image) that contains the region of interest, and also use the telephoto camera to capture the surroundings of the region of interest to obtain the panoramic image (i.e. the second image). In this way, the captured close-range image and panoramic image are sharper and rich.

In some embodiments of the present disclosure, the fixed camera may be started earlier compared to the rotatable camera during the capturing process. The displayer uses the cached image outputted by the fixed camera as the preview image. In this way, the user may select the region of interest for photographing via the image preview. That is, the region of interest may be selected by the user through clicking on the touch screen after the user previews the cached image outputted by the fixed camera. Alternatively, the user may move the electronic device such that the region of interest falls within the field of view of the fixed camera and the user clicks at a location on the touch screen to determine the main part concerned by the user in all the scenery within the field of view of the fixed camera, such that the rotatable camera may capture surroundings of the main part selected by the user. Alternatively, the user may move the region of interest into the field of view of the fixed camera, and the electronic device may autonomously recognize the main part concerned by the user in all the scenery within the field of view of the fixed camera, such that the rotatable camera may capture surroundings of the main part.

In addition, after the first image (e.g. the closed-range) is captured by the fixed camera and the second image (e.g. the panoramic image) is captured by the rotatable camera, the rotatable camera may be set to the standby state for further reducing the power consumption when it is detected within a certain time period that the user does not click on the touch screen for inputting the preset instruction.

In some embodiments of the present disclosure, controlling the second camera to rotate in act 161 includes controlling the second camera to rotate such that at least one of the plurality of fields of view at least partially overlaps the first field of view.

Figure 5:
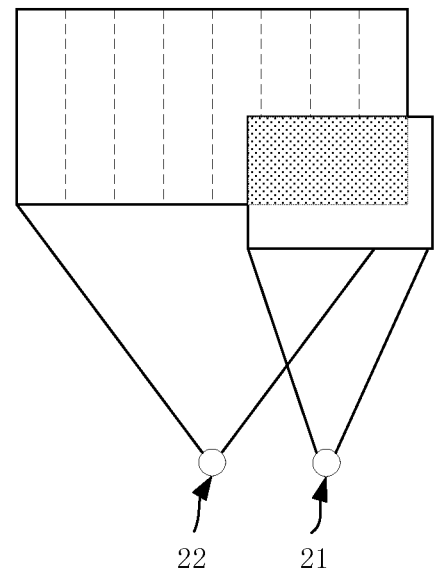
FIG. 5 is a schematic diagram illustrating an overlapped part in fields of view of a first camera and a second camera according to embodiments of the present disclosure.

For example, as illustrated in FIG. 5, the second camera 22 may employ a telephoto camera and the first camera 21 may employ a wide angle camera. The angle of view of the telephoto camera is lower than that of the wide angle camera. Therefore, the telephoto camera may be rotated to capture more scene images, in order to capture the panoramas image. The second field of view of the second camera 22 may be a sum of a plurality of fields of view of the second camera 22 after rotation. The second camera 22 may be controlled to rotate such that the second field of view of the second camera 22 is partially overlapped with the first field of view of the first camera 21, so that a degree of association between the first image (e.g. the closed-range image) and the second image (e.g. the panoramic image) may be increased and the user experience may be improved.

In some embodiments of the present disclosure, controlling the second camera to rotate in act 161 includes controlling the second camera to rotate such that the second field of view covers the first field of view.

Figure 6:
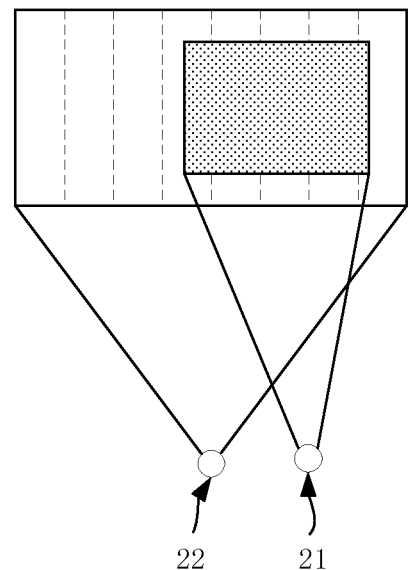
FIG. 6 is a schematic diagram illustrating an overlapped part in fields of view of a first camera and a second camera according to embodiments of the present disclosure.

For example, as illustrated in FIG. 6, the second camera 22 may employ a telephoto camera and the first camera 21 may employ a wide angle camera. The angle of view of the telephoto camera is lower than that of the wide angle camera. Therefore, the telephoto camera may be rotated to capture more scene images, in order to capture the panoramas image. The second field of view of the second camera 22 may be a sum of a plurality of fields of view of the second camera 22 after rotation. When the second camera 22 is rotated once, one image of the scene may be captured correspondingly. After a plurality of rotations, a plurality of images of the scene may be captured. The second image (e.g. the panoramic image) finally captured by the second camera 22 may be obtained by stitching the plurality of images captured through the plurality of rotations. That is, the second field of view of the second camera 22 may be obtained by stitching respective fields of view acquired by rotating the second camera 22 multiple times. The second camera 22 may be controlled to rotate so that the first field of view of the first camera 21 falls within the second field of view of the second camera 22. The second image (e.g. the panoramic image) captured by the second camera 22 contains the entire image of the region of interest, thus improving a degree of association between the first image (e.g. the closed-range image) and the second image (e.g. the panoramic image), and making the user experience better.

In some embodiments of the present disclosure, controlling the second camera to rotate in act 161 includes: at a preset time in a first exposure duration that the first camera captures the first image, controlling the second camera to start rotating to capture the second image of the second field of view.

Figure 7:
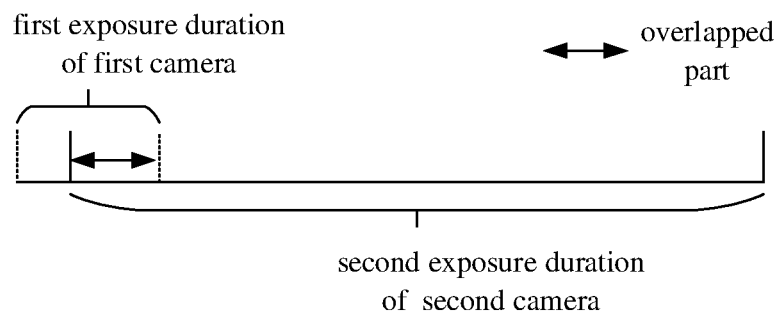
FIG. 7 is a schematic diagram illustrating an overlapped part in exposure durations of a first camera and a second camera according to embodiments of the present disclosure.

For example, as illustrated in FIG. 7, the first camera is controlled to capture the first image (e.g. the closed-range image) firstly, and the second camera is started to rotate to capture the second image (e.g. the panoramic image) at a moment in the first exposure duration that the first camera captures the first image. Therefore, the recorded first image (e.g. the closed-range image) and the recorded second image (e.g. the panoramic image) have a stronger association in time.

In some embodiments of the present disclosure, controlling the second camera to rotate in act 161 includes: when controlling the first camera to capture the first image, and controlling the second camera to start rotating to capture the second image of the second field of view, and controlling a second exposure duration that the second camera captures the second image to be greater than a first exposure duration that the first camera captures the first image.

Figure 8:
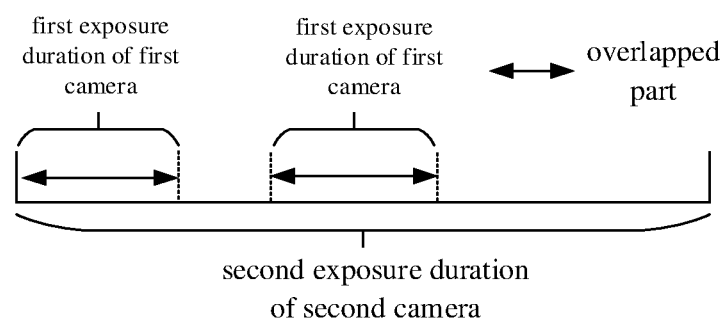
FIG. 8 is a schematic diagram illustrating an overlapped part in exposure durations of a first camera and a second camera according to embodiments of the present disclosure.

For example, as illustrated in FIG. 8, the first camera and the second camera are controlled to capture images simultaneously. Alternatively, the second camera may be first controlled to rotate for capturing the second image, for example, the panoramic image, and the first camera may be controlled to capture the first image, for example, the closed-range image during the second exposure period for capturing the second image by the second camera. Thus, the first exposure duration of the first camera totally falls within the second exposure duration of the second camera. Therefore, the recorded main image and the recorded panoramic image have a stronger association in time, and the user experience may be better.

In some embodiments of the present disclosure, the method further includes: when controlling the second camera to start rotating to capture the second image of the second field of view, controlling the first camera to capture a third image of the first field of view. That is, during a process of controlling the second camera to starting rotate so as to capture the second image of the second field of view, the first camera may be controlled to capture multiple times to obtain images of the first field of view, so that the user may obtain a better image of the first field of view, thereby enhancing the user experience.

In some embodiments of the present disclosure, the correspondence is configured to trigger an associated operation between the first image and the second image. The associated operation is configured to perform a first operation on the first image and perform the first operation on the second image synchronously, or perform the first operation on the first image and perform a second operation corresponding to the first operation on the second image synchronously.

For example, the inputting component receives an instruction for opening the first or third image from the user, and the displayer displays the first or third image (e.g. the closed-range image) and the second image (e.g. the panoramic image) in parallel or sequentially, when opening the first or third image (e.g. the closed-range image).

Figure 9:
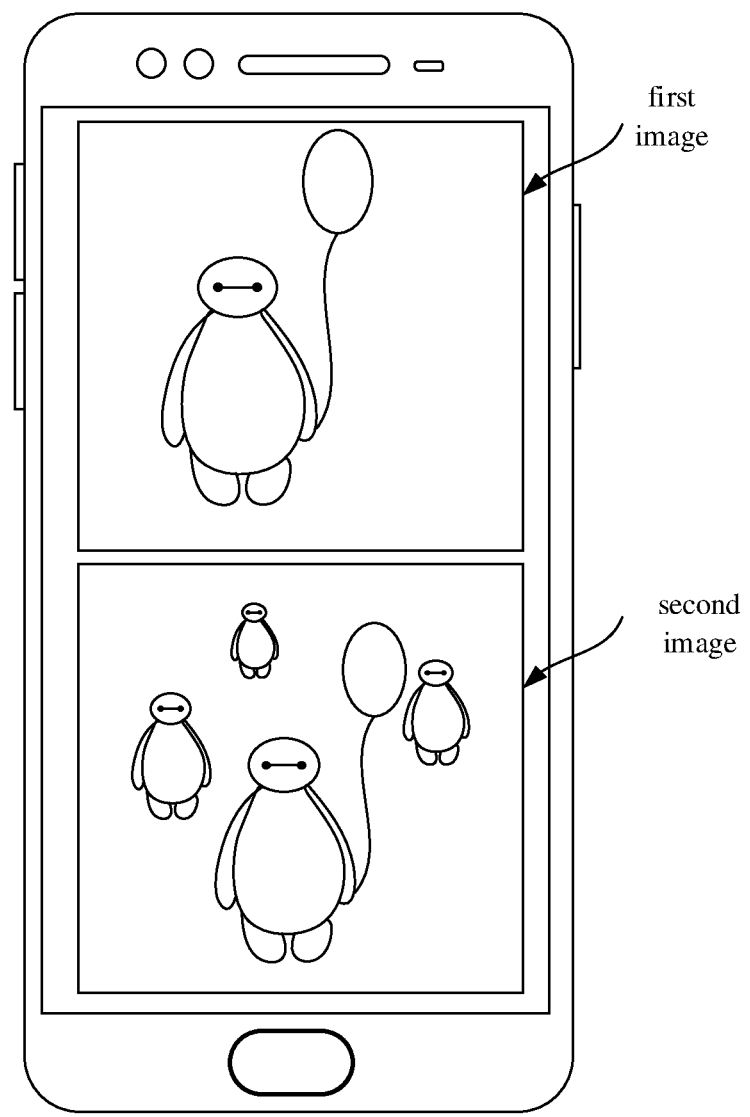
FIG. 9 is a schematic diagram illustrating a displaying state of a first image and a second image according to embodiments of the present disclosure.

For example, as illustrated in FIG. 9, when the user clicks the displayer to open the first or third image (e.g. the closed-range image) and the second image (e.g. the panoramic image) that are captured and stored in association with each other, the displayer displays simultaneously the first or third image (e.g. the closed-range image) captured by the first camera 21 and the second image (e.g. the panoramic image) captured by the second camera 22 side-by-side. The first or third image (e.g. the closed-range image) and the second image (e.g. the panoramic image) may be displayed on the displayer side-by-side from left to right or from up to down.

Figure 10:
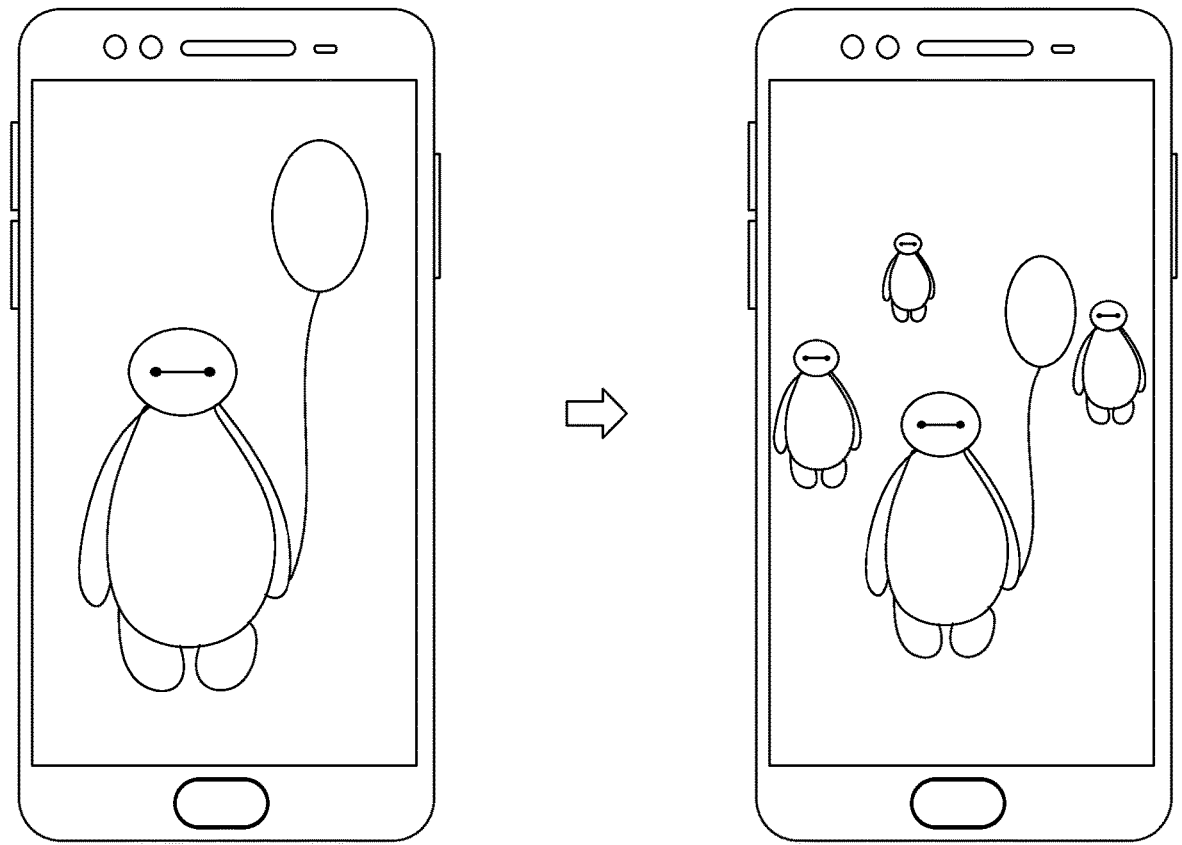
FIG. 10 is a schematic diagram illustrating a displaying state of a first image and a second image according to embodiments of the present disclosure.

For example, as illustrated in FIG. 10, when the user clicks the displayer to open the first or third image (e.g. the closed-range image) and the second image (e.g. the panoramic image) that are captured and stored in association with each other, the displayer displays the first or third image (e.g. the closed-range image) captured by the first camera 21 and the second image (e.g. the panoramic image) captured by the second camera 22 consecutively. That is, the displayer displays the first or third image (e.g. the closed-range image) captured by the first image 21 and then displays the second image (e.g. the panoramic image) associated with the first or third image (e.g. the closed-range image) and captured by the second camera 22 after a certain period of time.

Embodiments of the present disclosure also provide an electronic device.

The device includes a first camera, a second camera, a processor, and a memory for storing instructions executable by the processor. The processor is configured to: receive a preset instruction; activate the second camera when controlling the first camera to capture a first image of a first field of view; control the second camera to capture a second image of a second field of view, in which the second field of view is different from or not exactly the same with the first field of view; and store the first image and the second image, and establish a correspondence between the first image and the second image.

Figure 11:
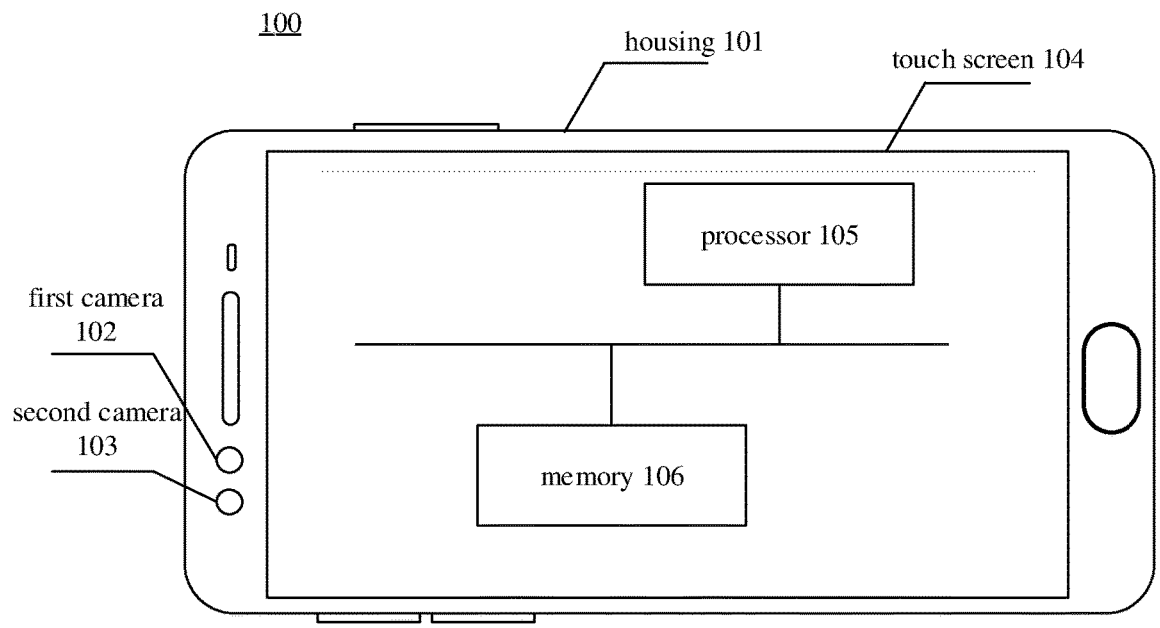
FIG. 11 is a schematic diagram illustrating a device according to embodiments of the present disclosure.

FIG. 11 is a schematic diagram illustrating a device according to embodiments of the present disclosure. In embodiments of the present disclosure, the device may be a smart phone, a computer, a portable android device, a personal digital assistant, a wearable device, etc.

As illustrated in FIG. 11, the device 100 may be the smart phone. The device 100 may include a housing 101, a first camera 102, a second camera 103, a touch screen 104, a processor 105 and a memory 106. The first camera 102 and the second camera 103 are interchangeable.

In some embodiments, the first camera 102 and the second camera 103 may be front dual cameras or rear dual cameras. The device 100 may further include an inputting component (not illustrated in FIG. 11). It should be understood that, the inputting component may further include one or more of the followings: an inputting interface provided by the touch screen 104, a physical button of the device 100, a microphone, etc.

It should be understood that, the device 100 may further include one or more of the following components (not illustrated in FIG. 11): a power component, an audio component, an input/output (I/O) interface, a sensor component and a communication component. The power component is configured to provide power to various components of the device 100. The audio component is configured to output and/or input audio signals, for example, the audio component includes a microphone. The I/O interface is configured to provide an interface between the processor 105 and peripheral interface modules. The sensor component includes one or more sensors to provide status assessments of various aspects of the device 100. The communication component is configured to facilitate communication, wired or wirelessly, between the device 100 and other devices.

The processor 105 is configured to: receive a preset instruction; activate the second camera 103 when controlling the first camera 102 to capture a first image of a first field of view; control the second camera 103 to capture a second image of a second field of view, in which the second field of view is different from or not exactly the same with the first field of view; store the first image and the second image, and establish a correspondence between the first image and the second image.

The processor 105 is further configured to: start the first camera 102 and the second camera 103; and control the second camera 103 to enter a standby mode.

The preset instruction includes a panoramic capturing instruction, or a triggering instruction for activating the second camera 103.

The processor 105 is configured to control the second camera 103 to capture the second image of the second field of view by acts of: controlling the second camera 103 to rotate to capture the second image of the second field of view, in which the second field of view is an overall field of view defined by a plurality of fields of view of the second camera 103 during rotating, and the first field of view includes a field of view when the first camera 102 captures.

The processor 105 is configured to control the second camera 103 to rotate by acts of: controlling the second camera 103 to rotate such that at least one of the plurality of fields of view at least partially overlaps with the first field of view.

The processor 105 is configured to control the second camera 103 to rotate by acts of: controlling the second camera 103 to rotate such that the second field of view to cover the first field of view.

The processor 105 is configured to control the second camera 103 to rotate so as to capture the second image of the second field of view by acts of: at a preset time in a first exposure duration that the first camera 102 captures the first image, controlling the second camera 103 to start rotating to capture the second image of the second field of view.

The processor 105 is configured to control the second camera 103 to rotate so as to capture the second image of the second field of view by acts of: when controlling the first camera 102 to capture the first image, and controlling the second camera 103 to start rotating to capture the second image of the second field of view, and controlling a second exposure duration that the second camera 103 captures the second image to be greater than a first exposure duration that the first camera 102 captures the first image.

The processor 105 is further configured to: when controlling the second camera 103 to start rotating to capture the second image of the second field of view, control the first camera 102 to capture a third image of the first field of view.

With the specific operations of the device described above in embodiments of the present disclosure, reference is made to the implementation process of corresponding acts in the above method, which will not be elaborated herein.

Embodiments of the present disclosure also provide a non-transitory computer-readable storage medium having stored therein instructions that, when executed by a processor of an electronic terminal, causes the electronic terminal to perform a method for controlling an electronic device. The method includes: detecting whether a preset instruction is received; when the preset instruction is received, activating a second camera when controlling a first camera to capture a first image of a first field of view; controlling the second camera to capture a second image of a second field of view, wherein the second field of view is different with the first field of view; storing the first image and the second image, and establishing a correspondence between the first image and the second image.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", and "anti-clockwise", refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein for purposes of description and are not intended to indicate or imply relative importance or significance, or imply the number of defined features. Thus, the feature defined with "first" and "second" may comprise one or more this feature. In the description of the present disclosure, the term "a plurality of" means two or more than two, unless specified otherwise.

Various embodiments and examples are provided in the above description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an illustrative embodiment", "an example," "a specific example," or "some examples," means that a particular feature, structure, material, or characteristic described in connection with the embodiment or example is included in at least one embodiment or example of the present disclosure. Thus, the indicative expressions of the above phrases are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

What is claimed is:

1. A method for controlling an electronic device comprising a first camera and a second camera, wherein, the first camera and the second camera are front dual cameras or rear dual cameras; the first camera is a fixed wide-angle camera and the second camera is a rotatable telephoto camera, the method comprising:
    starting the first camera and the second camera;
    controlling the second camera to enter a standby mode, wherein in the standby mode, the second camera is kept in an energized state but does not perform operations;
    receiving a preset instruction;
    based on the preset instruction, activating the second camera when controlling the first camera to capture a first image of a first field of view as a close-range image;
    controlling the second camera to capture a second image of a second field of view as a panoramic image, wherein the second field of view is different from or not exactly the same with the first field of view, wherein controlling the second camera to capture the second image of the second field of view comprises: controlling the second camera to rotate to capture the second image of the second field of view as the panoramic image, wherein the second field of view is an overall field of view defined by a plurality of fields of view of the second camera during rotating, and the first field of view comprises a field of view when the first camera captures, wherein controlling the second camera to rotate comprises:
    controlling the second camera to rotate such that at least one of the plurality of fields of view at least partially overlaps the first field of view, and
    when controlling the first camera to capture the first image, controlling the second camera to start rotating to capture the second image of the second field of view, and controlling a second exposure duration that the second camera captures the second image to be greater than a first exposure duration that the first camera captures the first image; and storing the first image and the second image, and establishing a correspondence between the first image and the second image, wherein the correspondence is configured to trigger an associated operation between the first image and the second image, and the associated operation is configured to perform a first operation on the first image and perform the first operation on the second image synchronously, or perform the first operation on the first image and perform a second operation corresponding to the first operation on the second image synchronously.

2. The method according to claim 1, wherein the preset instruction comprises a panoramic capturing instruction, or a triggering instruction for activating the second camera.

3. The method according to claim 1, wherein controlling the second camera to rotate comprises: controlling the second camera to rotate such that the second field of view covers the first field of view.

4. The method according to claim 1, wherein controlling the second camera to rotate so as to capture the second image of the second field of view comprises: at a preset time in a first exposure duration that the first camera captures the first image, controlling the second camera to start rotating to capture the second image of the second field of view.

5. The method according to claim 1, further comprising: when controlling the second camera to start rotating to capture the second image of the second field of view, controlling the first camera to capture a third image of the first field of view.

6. An electronic device, comprising:
    a first camera;
    a second camera;
    a processor; and
    a memory for storing instructions executable by the processor,
    wherein the first camera and the second camera are front dual cameras or rear dual cameras; the first camera is a fixed wide-angle camera and the second camera is a rotatable telephoto camera; wherein the processor is configured to:

start the first camera and the second camera;
control the second camera to enter a standby mode, wherein in the standby mode, the second camera is kept in an energized state but does not perform operations;
receive a preset instruction;
based on the preset instruction, activate the second camera when controlling the first camera to capture a first image of a first field of view as a close-range image;
control the second camera to capture a second image of a second field of view as a panoramic image, wherein the second field of view is different from or not exactly the same with the first field of view; and
store the first image and the second image, and establish a correspondence between the first image and the second image, wherein the correspondence is configured to trigger an associated operation between the first image and the second image, and the associated operation is configured to perform a first operation on the first image and perform the first operation on the second image synchronously, or perform the first operation on the first image and perform a second operation corresponding to the first operation on the second image synchronously;
wherein the processor is configured to control the second camera to capture the second image of the second field of view by acts of:
controlling the second camera to rotate to capture the second image of the second field of view as the panoramic image, wherein the second field of view is an overall field of view defined by a plurality of fields of view of the second camera during rotating, and the first field of view comprises a field of view when the first camera captures; and,
wherein the processor is configured to control the second camera to rotate by acts of:
controlling the second camera to rotate such that at least one of the plurality of fields of view at least partially overlaps the first field of view, and
when controlling the first camera to capture the first image, controlling the second camera to start rotating to capture the second image of the second field of view, and controlling a second exposure duration that the second camera captures the second image to be greater than a first exposure duration that the first camera captures the first image.

7. The device according to claim 6, wherein the preset instruction comprises a panoramic capturing instruction, or a triggering instruction for activating the second camera.

8. The device according to claim 6, wherein the processor is configured to control the second camera to rotate by acts of: controlling the second camera to rotate such that the second field of view to cover the first field of view.

9. The device according to claim 6, wherein the processor is configured to control the second camera to rotate so as to capture the second image of the second field of view by acts of:
at a preset time in a first exposure duration that the first camera captures the first image, controlling the second camera to start rotating to capture the second image of the second field of view.

10. The device according to claim 6, wherein the processor is further configured to: when controlling the second camera to start rotating to capture the second image of the second field of view, control the first camera to capture a third image of the first field of view.

11. A non-transitory computer-readable storage medium having stored therein instructions that, when executed by a processor of an electronic terminal comprising a first camera and a second camera, causes the electronic terminal to perform a method for controlling an electronic device, wherein, the first camera and the second camera are front dual cameras or rear dual cameras; the first camera is a fixed wide-angle camera and the second camera is a rotatable telephoto camera, the method comprising:
starting the first camera and the second camera;
controlling the second camera to enter a standby mode, wherein in the standby mode, the second camera is kept in an energized state but does not perform operations;
receiving a preset instruction, based on the preset instruction, activating the second camera when controlling the first camera to capture a first image of a first field of view as a close-range image;
controlling the second camera to capture a second image of a second field of view as a panoramic image, wherein the second field of view is different from or not exactly the same with the first field of view, wherein controlling the second camera to capture the second image of the second field of view comprises: controlling the second camera to rotate to capture the second image of the second field of view as the panoramic image, wherein the second field of view is an overall field of view defined by a plurality of fields of view of the second camera during rotating, and the first field of view comprises a field of view when the first camera captures, wherein controlling the second camera to rotate comprises:
controlling the second camera to rotate such that at least one of the plurality of fields of view at least partially overlaps the first field of view, and
when controlling the first camera to capture the first image, controlling the second camera to start rotating to capture the second image of the second field of view, and controlling a second exposure duration that the second camera captures the second image to be greater than a first exposure duration that the first camera captures the first image; and
storing the first image and the second image, and establishing a correspondence between the first image and the second image, wherein the correspondence is configured to trigger an associated operation between the first image and the second image, and the associated operation is configured to perform a first operation on the first image and perform the first operation on the second image synchronously, or perform the first operation on the first image and perform a second operation corresponding to the first operation on the second image synchronously.

* * * * *